Figure 4:
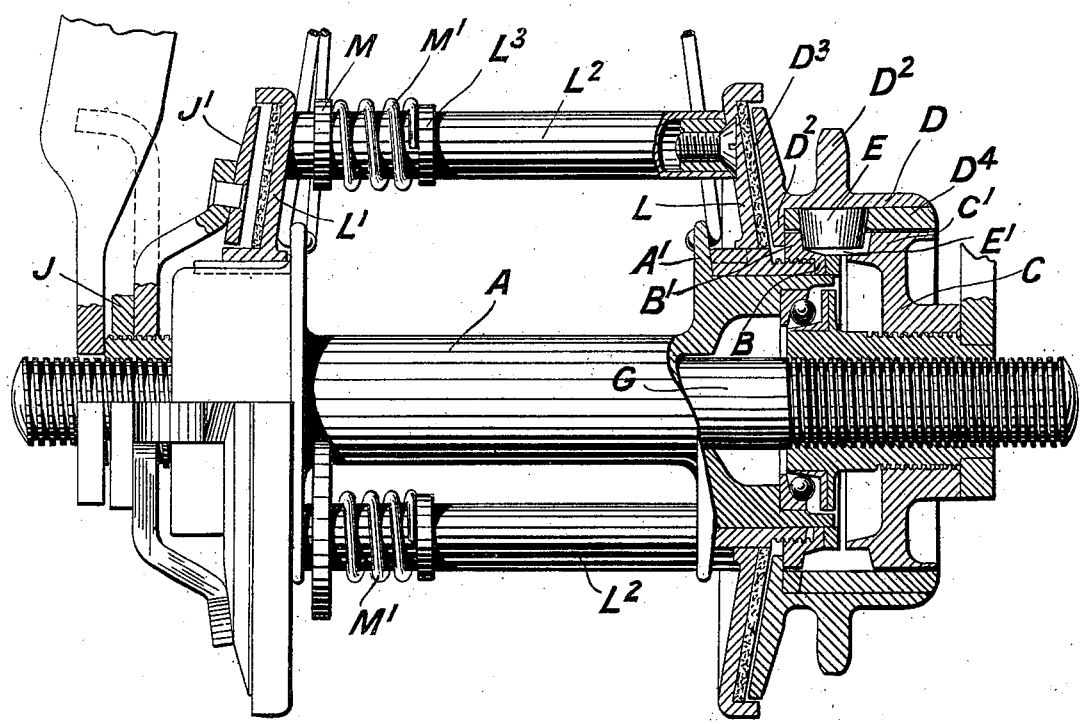

No. 654,053. Patented July 17, 1900.
A. CUTHBERT.
BACK PEDALING BRAKE.
(Application filed Jan. 21, 1899.)
(No Model.) 2 Sheets—Sheet 1.
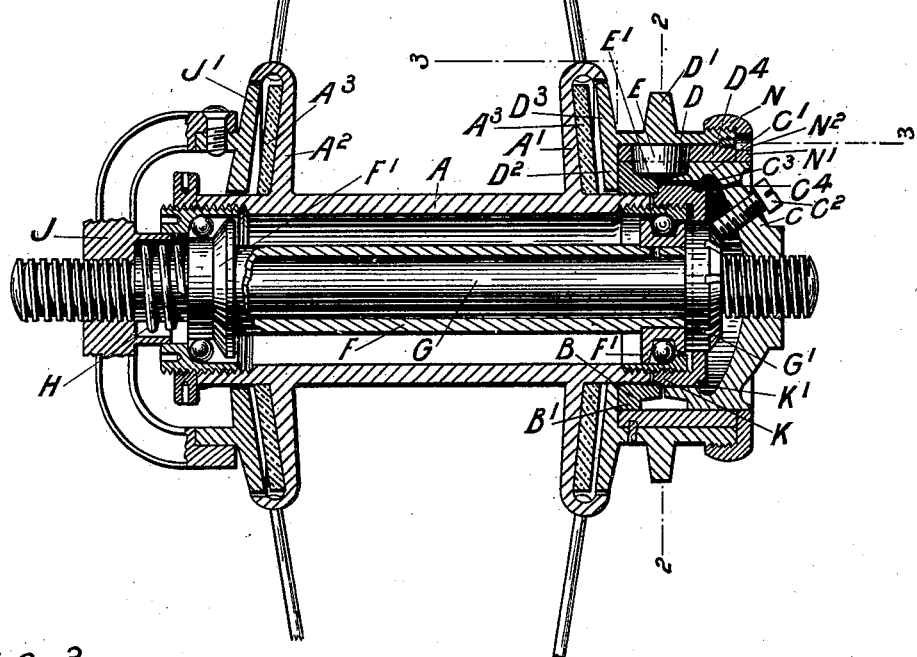
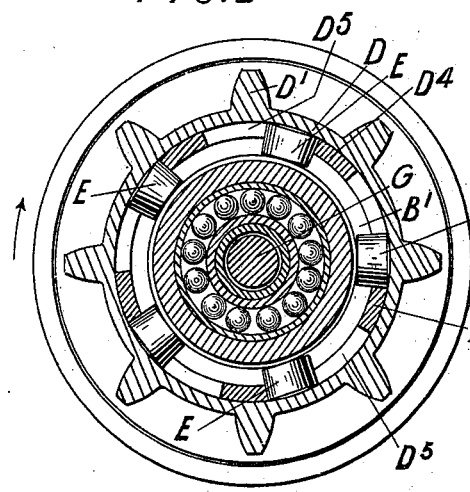
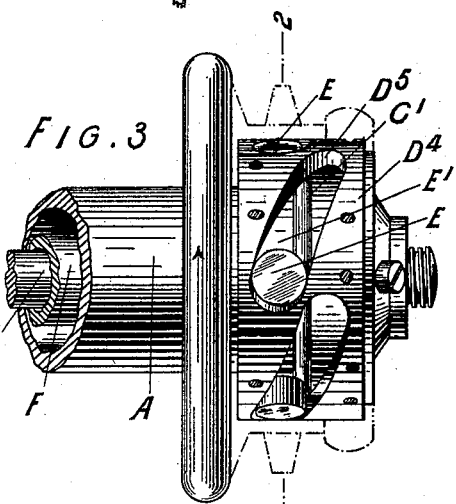

No. 654,053.  
A. CUTHBERT.  
BACK PEDALING BRAKE.  
(Application filed Jan. 21, 1899.)  
Patented July 17, 1900.

(No Model.)  
2 Sheets—Sheet 2.

UNITED STATES PATENT OFFICE.

ARTHUR CUTHBERT, OF CANNES, FRANCE.

BACK-PEDALING BRAKE.

SPECIFICATION forming part of Letters Patent No. 654,053, dated July 17, 1900.

Application filed January 21, 1899. Serial No. 703,005. (No model.)

*To all whom it may concern:*

Be it known that I, ARTHUR CUTHBERT, a subject of the Queen of England, residing at Cannes, France, have invented certain new and useful Improvements in or Relating to Cycle Driving-Gear and Brake Mechanism, (for which I have made application for Letters Patent in Great Britain under No. 26,638, dated December 17, 1898,) of which the following is a specification.

This invention relates to cycle driving-gear and brake mechanism, and has for its object to enable the cycle to be provided with a "free wheel"—that is to say, to enable the rotation of the pedals to be stopped while the machine continues running.

This invention also provides for a brake which is operated by back-pedaling action.

According to this invention a ring provided with a flange and conveniently formed conical is mounted rigidly upon the exterior of the sprocket end of the hub of the driving-wheel. Opposite this flanged ring and fixed upon the axle is arranged another ring similarly provided with a flange. Inclosing these two rings is a cylindrical casing, upon the exterior of which are formed the teeth of the sprocket-wheel, while upon the interior are formed a series of slots arranged helically. In each slot is carried a roller so arranged that its axis is at right angles to the axis of the driving-wheel. These rollers are of sufficient length to project inwardly in a radial manner from the slots in the cylindrical casing, the inner ends of the rollers lying in the annular groove formed between the flanges of the fixed and revolving rings above mentioned. On the end of the cylindrical casing nearest to the hub is formed an inwardly-directed flange which lies on the inside of the flanged ring mounted on the end of the hub. At the innermost end or face of the cylindrical casing is formed a braking-surface adapted under certain conditions to be brought in contact with a second braking-surface formed upon the hub, one or other, or both, of these surfaces being preferably faced with leather, rubber, or other similar material.

The operation of the device is as follows: Upon forward rotation of the pedals the cylindrical casing forming the sprocket-wheel is rotated, the rollers by this movement being at first left behind. The effect of this is to cause the casing to move slightly outward in an axial direction. This movement ceases as soon as the inside flange comes in contact with the flanged ring upon the hub, when the latter will be jammed between the rollers in their inclined slots and the flange on the cylindrical casing, this arrangement forming an effective clutch which will cause the rotation of the pedals to operate the driving-wheel. Upon stopping the movement of the pedals the clutch is thrown out of action, and upon reversing the pedal movement the rollers move along the inclined slots in the cylindrical casing until they come in contact with the flange on the fixed ring, when the casing is moved axially inward until its brake-surface comes in contact with the brake-surface on the hub.

In order to obtain increased power, the brake may be constructed to operate upon both sides of the hub. For this purpose a similar or other brake surface is formed upon the opposite side of the hub, and facing it is arranged a fixed brake-ring carried upon the axle of the machine. In this construction the cones of the bearing are mounted upon a sleeve which can slide freely in an axial direction upon the axle, but is constantly pressed toward the sprocket side by spring motion. Upon operating the first brake by back-pedaling in the above-described manner the whole hub is moved axially by the axial motion of the sprocket-casing, so that the brake-surface upon the side opposite to the sprocket is brought in contact with the fixed brake-ring.

In yet another construction the brake-surfaces on either side of the hub are so mounted that they can travel axially while being compelled to rotate with the hub. These brake-surfaces are also connected together by rods or pillars passing between the spokes of the wheel, these rods being spring-controlled, so as to constantly force the brake-surfaces axially toward the sprocket-wheel brake-surfaces. It will be seen that with the cylindrical casing carrying the sprocket-wheel and the clutch mechanism arranged as first above described upon back-pedaling the brake-surface on the cylindrical casing will be brought in contact with the corresponding brake-surface on the hub, this contact causing the latter to move axially, and consequently the brake-surface on the opposite side of the hub to also move axially until it is brought in contact with the fixed brake-ring.

It is to be understood that the details of this invention may be varied in accordance with requirements and to meet the varying constructions of hub, wheel, or cycle to which the apparatus may be applied.

In the accompanying drawings, Figure 1 is a longitudinal section of the improved driving-gear and brake mechanism. Fig. 2 is a section on the line 2 2 of Fig. 1. Fig. 3 is a sectional elevation on the line 3 3 of Fig. 1 on a plane at right angles to that of Fig. 1. Fig. 4 is a view half in longitudinal section and half in elevation of a modification.

Like letters indicate like parts throughout the drawings.

One or conveniently both of the flanges $A'$ and $A^2$ of the driving-wheel hub A are made somewhat deeper than usual, and one, $A'$, is faced with leather or other material $A^3$ to form a brake-surface. Upon the outer end of the hub on the sprocket-wheel side is mounted a ring B with a flange $B'$. Opposite to this ring and fixed upon the axle is arranged a ring C, having a flange $C'$. Inclosing the rings B and C is a cylindrical casing or sprocket-ring D, having teeth $D'$ formed on its exterior and at its inner side an inwardly-directed flange $D^2$, constituting part of a brake-surface $D^3$, situated so that it can be brought in contact with the brake-surface on the flange $A'$ of the hub by longitudinal movement of the sprocket-ring D, brought about in the manner hereinafter described. The sprocket-ring D in the construction shown is provided with a liner $D^4$, which is fast to said sprocket-wheel, in which are cut several helical slots or grooves $D^5$. In each of the latter lies a roller E, a portion of which projects from the inner side of the sprocket-ring and lies in the groove $E'$, formed between the flanges $B'$ and $C'$ of the rings B and C.

The operation of the device is as follows: When the pedals of the machine are propelled in the forward direction, the sprocket-ring D, with its liner $D^4$, is rotated in the direction of the arrows in Figs. 2 and 3. The rollers E when this movement takes place lag behind in the slots $D^5$ until they come in contact with the flange $B'$ of the ring B, when the sprocket-ring D is caused to move in an axial direction outward until its flange $D^2$ comes against the inner side of the flange $B'$, which is then jammed between the flange $D^2$ and the rollers E. By this means the driving-wheel is propelled forward. Upon ceasing to rotate the pedals the rollers E move forward, the clutch is thrown out of gear, and the wheel is free to continue to rotate. If now the pedals be rotated backward, the rollers E move down toward the outer ends of the slots $D^5$ in the sprocket-ring D until they come in contact with the flange $C'$ of the fixed ring C. When this occurs, the sprocket-ring D commences to move longitudinally inward until the brake-surface $D^3$ comes in contact with the brake-surface on the flange $A'$ of the hub, thus checking the rotation of the driving-wheel.

If it is desired to apply the brake to one side of the hub only, the above-described construction may be used by itself without further altering the construction of the hub; but if increased braking power is required the hub may be arranged in the following manner, so as to enable the brake to be applied to both sides at the same time, both flanges $A'$ $A^2$ being faced with material $A^3$ for this purpose: The cones $F'$ of the bearings are mounted upon a sleeve F, which is free to move longitudinally upon the axle G. Upon the sprocket end of the axle is formed or rigidly mounted a shoulder $G'$, against which the cone on that side is constantly pressed by a coiled spring H, arranged upon the axle between the cone at the other side and a nut J, fixed upon the latter. The nut J carries connected to it by suitable arms a brake-ring $J'$, situated opposite to the brake-surface $A^3$, formed on the flange $A^2$ of the hub. If now the brake be applied by back-pedaling in the manner above described, the sprocket-ring D is moved longitudinally until the brake-surface $D^3$ comes in contact with the brake-surface on the flange $A'$ of the hub, when the whole of the latter and of course the wheel also moves longitudinally upon the axle until the brake-surface on the flange $A^2$ comes in contact with the fixed brake-ring $J'$.

In order to enable the fixed ring C to be adjusted and held in the required position, it may be screwed upon the end of the axle G and locked in any position by means of a set-screw $C^2$, whose end bears against flats or depressions formed on or in the outer side of the shoulder $G'$ on the axle.

As it is most desirable that oil should not be allowed to find its way from the ball-bearings of the wheel to the clutch-rollers E, a ring, such as K, is mounted upon the outer end of the hub A. This ring K projects in such a manner as to intercept any oil which may escape from the bearing and conduct it from the lip or ridge $K'$ into an annular groove $C^3$, formed in the inner side of the fixed ring C, whence the oil can escape through a passage $C^4$ to the outer side of this ring.

In Fig. 4 is shown another arrangement for enabling the brake to be applied to both sides of the wheel at the same time. In this construction in place of forming the brake-surfaces on the flanges of the hub special brake-rings L $L'$ are mounted upon the outer end of the hub in such a manner that while being compelled to rotate with the hub they can move longitudinally upon it. These rings are connected together by several rods $L^2$, which pass between the spokes and through collars M, carried either upon the spokes or upon the flanges of the hub. Coiled springs $M'$ are carried upon the rods $L^2$ between the collars M and collars $L^3$, the springs tending constantly to force the rings toward the sprocket side of the wheel. The sprocket-ring is arranged to operate as previously described, its brake-surface $D^3$ lying opposite the brake-surface on the brake-ring L, the fixed brake-ring $J'$ on the opposite side of the wheel being arranged opposite to the brake-ring $L'$. When the pedals are rotated backward and the sprocket-wheel moved, as before mentioned, so as to bring the brake-surface $D^3$ against the brake-surface on the ring L, the whole cage formed by the rings L $L'$ and the rods $L^2$ is moved longitudinally upon the hub until the brake-surface on the ring $L'$ comes against the brake-ring $J'$. In this construction the bearing-cones may be mounted, as usual, directly upon the axle.

The liner $D^4$ may be fixed within the sprocket-ring D, as found most convenient, either by screws passing through the two or, as shown in Fig. 1, by screwing upon the outer side of the sprocket-ring a flanged ring N, through whose flange $N'$ are several set-screws $N^2$, which engage with and lock together the edges of the liner and sprocket-ring.

It must be understood that the slots or grooves $D^5$ may be formed in the substance of the sprocket-ring instead of in a liner, as above described and illustrated, the liner being then dispensed with.

I claim—

1. In a cycle driving-gear and brake mechanism, the combination with an internally-slotted longitudinally-movable sprocket-ring, a brake-surface carried by said sprocket, a cooperating brake-surface carried by the wheel-hub, a rotating and a fixed flange, bodies movable in the slots of the sprocket-ring, whereby as said bodies are brought in contact with the fixed or rotating flange the sprocket-wheel will be moved in or out, and act as a clutch or brake; substantially as described.

2. In a cycle driving-gear and brake mechanism, the combination with the sprocket-ring having the flange on its inner side, the liner secured to said sprocket-ring provided with a series of helical grooves, the movable and fixed rings, inclosed by said sprocket-ring, said rings provided with flanges so positioned as to leave an annular groove between them, and rollers or equivalents engaging with both grooves; substantially as and for the purpose set forth.

3. In a cycle driving-gear and brake mechanism, the combination with the sprocket-wheel having the flange on its inner side movable longitudinally the liner fast to said wheel, and having the series of inclined grooves, the fixed and rotating rings, having the annular groove between them and the rollers lying in the inclined grooves and extending down into the annular grooves, substantially as described.

4. In a cycle driving-gear and brake mechanism the combination of a fixed wheel-axle, a wheel-hub mounted rotatably thereon, a flange B $B'$ secured on the wheel-hub, a fixed flange C $C'$ juxtaposed to the flange B $B'$, an internally-slotted sprocket-ring D $D^4$ free to rotate and move laterally relatively to the flanges B $B'$ and C $C'$, movable bodies arranged within the slots of the sprocket-ring and between the flanges B $B'$ and C $C'$, a brake-ring secured to the sprocket-ring and juxtaposed to a brake-surface and a stop to limit the lateral movement of the sprocket-ring as set forth.

5. In a cycle driving-gear and brake mechanism the combination of a fixed wheel-axle, a wheel-hub mounted rotatably thereon, a flange B $B'$ secured on the wheel-hub, a fixed flange C $C'$ juxtaposed to the flange B $B'$, an internally-slotted sprocket-ring D $D^4$ free to rotate and move laterally relatively to the flanges B $B'$ and C $C'$, movable bodies arranged within the slots of the sprocket-ring and between the flanges B $B'$ and C $C'$, a brake-ring $D^3$ and a flange $D^2$ secured to the sprocket-ring and a brake-surface arranged on the hub of the cycle-wheel as set forth.

6. In a cycle driving-gear and brake mechanism the combination of a fixed wheel-axle, a sleeve free to move longitudinally thereon a device whereby the sleeve is always urged in one direction upon the axle a wheel-hub mounted rotatably on the sleeve, a brake-surface provided at each end of the hub, a flange B $B'$ secured on one end of the hub, a fixed flange C $C'$ juxtaposed to the flange B $B'$, an internally-slotted sprocket-ring D $D^4$ free to rotate and move laterally relatively to the flanges B $B'$ and C $C'$ movable bodies arranged within the slots of the sprocket-ring and between the flanges B $B'$ and C $C'$ a brake-ring $D^3$ and flange $D^2$ secured to the sprocket-ring and juxtaposed to the brake-surface at that end of the hub, and a fixed brake-ring arranged to coöperate with the brake-surface at the opposite end of the hub as set forth.

7. In a cycle driving-gear and brake mechanism, the combination with the fixed wheel-axle, the sleeve free to move longitudinally thereon, the wheel-hub rotatably mounted on the sleeve, the brake-surface provided at each end of the hub, the cones carried by said sleeve, the shoulder on the axle, the spring for pressing the cone against said shoulder, the fixed brake-ring, the longitudinally-movable sprocket-ring, the brake-surface carried by said sprocket, and mechanism for moving said sprocket longitudinally whereby its brake-surface comes in contact with the coöperating brake-surface on the wheel-hub, and the hub with its wheel moved longitudinally on its axle, until the brake-surface on the opposite side of the hub is brought in contact with the fixed brake-ring; substantially as described.

In testimony whereof I have hereunto set my hand in the presence of the two subscribing witnesses.

ARTHUR CUTHBERT.

Witnesses:
 ALFRED J. BOULT,
 HARRY B. BRIDGE.